H. B. ETHERIDGE.
WEEDING MACHINE.
APPLICATION FILED SEPT. 8, 1910.
989,136.
Patented Apr. 11, 1911.
2 SHEETS—SHEET 2.
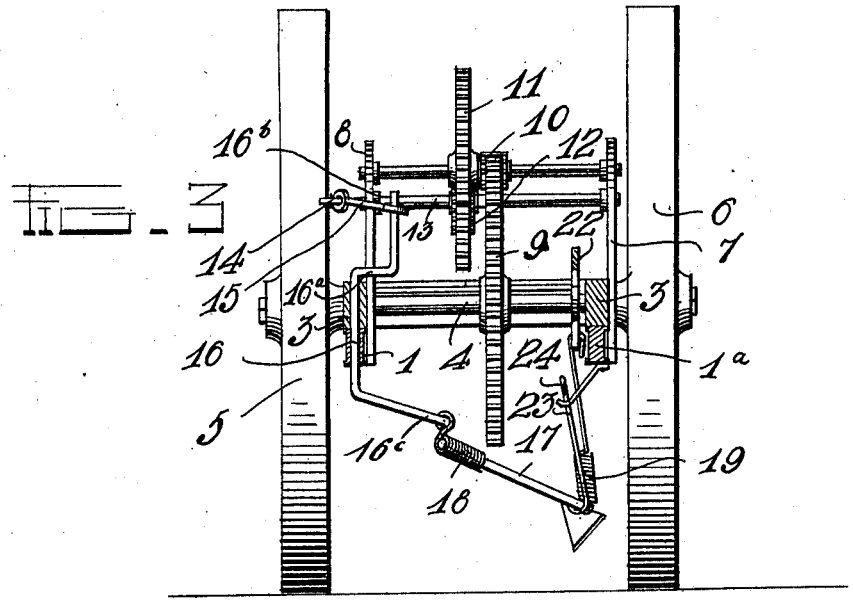
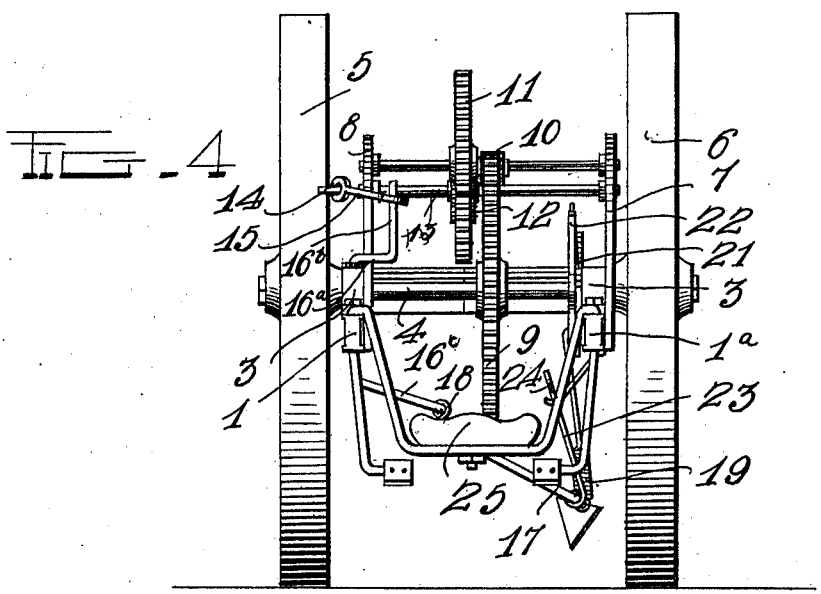
Witnesses
C. P. Hardy
O. B. Hopkins
Inventor
H. B. Etheridge
by H. B. Willson & Co
Attorneys

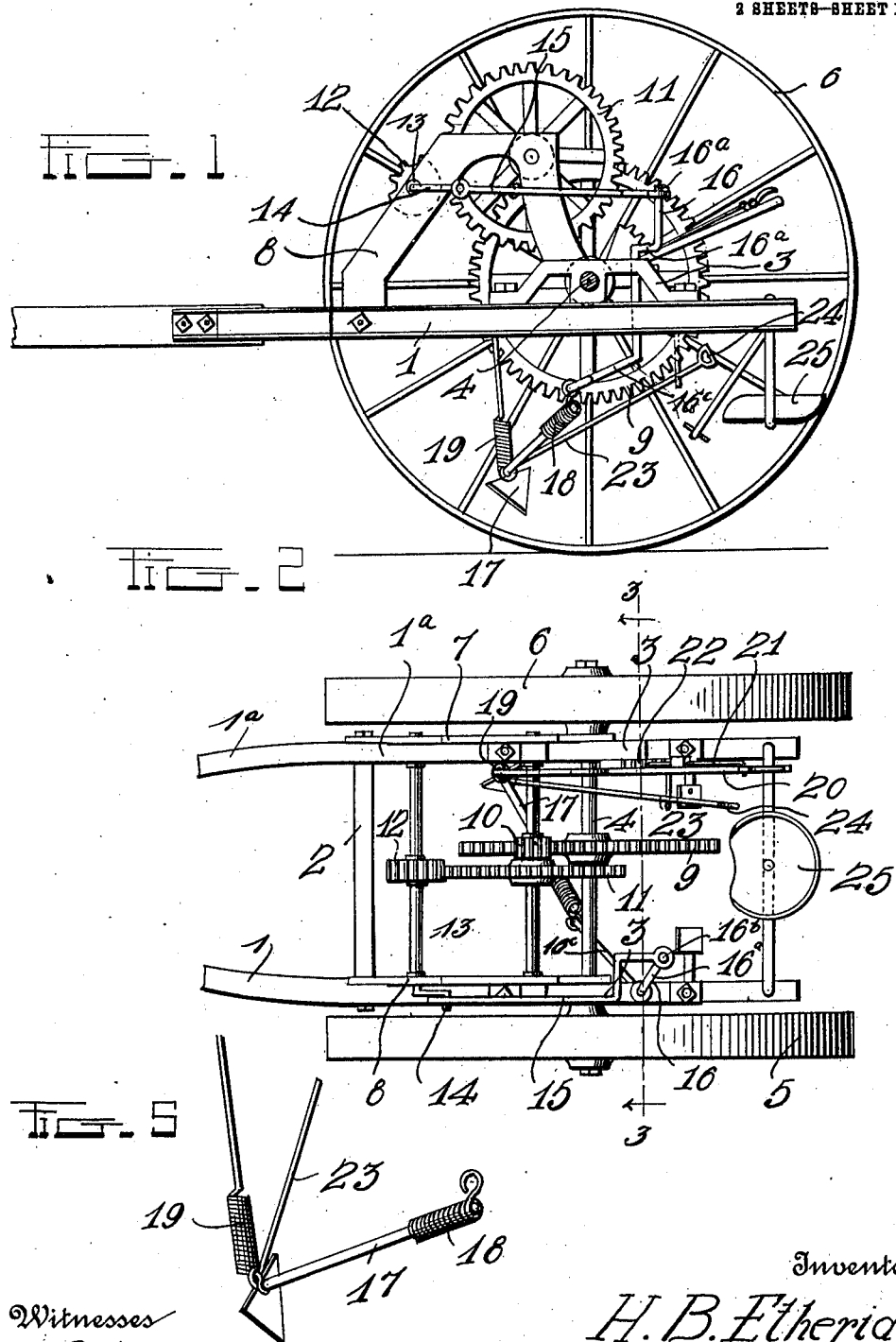

UNITED STATES PATENT OFFICE.

HALLS B. ETHERIDGE, OF NORTHWEST, VIRGINIA.

WEEDING-MACHINE.

989,136. Specification of Letters Patent. Patented Apr. 11, 1911.

Application filed September 8, 1910. Serial No. 580,969.

*To all whom it may concern:*

Be it known that I, HALLS B. ETHERIDGE, a citizen of the United States, residing at Northwest, in the county of Norfolk and State of Virginia, have invented certain new and useful Improvements in Weeding-Machines; and I do declare the following to be a full, clear, and exact description of the invention, such as will enable others skilled in the art to which it appertains to make and use the same.

This invention relates to an improved weeding machine for cotton, corn, and similar articles.

One object of the invention is to provide a simply constructed and efficient machine in which the weeding hoe is operated transversely of the machine and also with a sidewise reciprocating motion.

With this and other objects in view, the invention consists of certain novel features of construction, combination and arrangement of parts as will be more fully described and particularly pointed out in the appended claims.

In the accompanying drawings:—Figure 1 represents a side elevation of this improved weeder with one of the ground wheels removed; Fig. 2 is a top plan view thereof; Fig. 3 is a transverse vertical section taken on the line 3—3 of Fig. 2; Fig. 4 is a rear elevation thereof; and Fig. 5 is a perspective view of the hoe and its operating parts detached.

In the embodiment illustrated, a pair of long thills 1 and 1ª are shown connected intermediately of their ends by a cross bar 2 to which the usual swingletree is attached. The rear ends of these thills are provided on their upper faces with pillows, as 3, in which an axle 4 is revolubly mounted, the ends of said axle projecting beyond the outer faces of said thills. Ground wheels 5 and 6 are mounted on the projecting ends of said axle 4, the wheel 5 being fixed to the axle and the wheel 6 loose thereon.

A frame for supporting the operating cog wheels of the machine is mounted on said thills and preferably comprises two substantially inverted V-shaped side members 7 and 8, the member 7 being mounted on the outer face of one of the thills between it and the fixed wheel 5, and the other member 8 mounted on the inner face of the other thill, one end of said members being fixed to the thills in advance of the axle and the other end being provided with apertures through which the axle 4 extends.

A large gear wheel 9 is fixed to the axle 4 between the thills and meshes with a pinion 10 secured to the hub of a smaller gear wheel 11, the shaft of which is revolubly mounted in and connects the apex of the frame members 7 and 8. This wheel 11, meshes with a pinion 12 fixed to a shaft 13, revolubly mounted in the front portion of the frame. A crank member 14 is fixed at one end to the shaft 13 and at its other end is connnected by means of a pitman 15 with a hoe operating crank 16, now to be described. This crank shaft 16 extends vertically through the thill 1 and the pillow mounted thereon and the upper end thereof is bent laterally at 16ª, and then upwardly, the upwardly extending portion 16ᵇ, being pivotally connected with the pitman 15. The lower end of the shaft 16 which projects below the thill 1 is bent laterally in a plane at right angles to the laterally extending arm 16ª of the upper portion thereof and is connected with a hoe 17 preferably by means of a coiled spring 18 which is wound on the handle of the hoe 17 with the inner end thereof fixed to said handle, and its outer end pivotally engaged with said depending arm 16ᶜ of the crank shaft 16. Another coiled spring 19 is engaged at one end with the neck of the hoe and at its opposite end is connected with one end of a lever 20. This lever 20 is fulcrumed intermediately of its ends on the axle 4, between the hub of the gear wheel 9 and the inner face of the thill 1. This lever is designed to raise and lower the hoe and is provided with a spring pressed dog 21, adapted to engage a segmental rack 22, fixed to the inner face of the adjacent thill whereby said lever is held in adjusted position. A hand lever 23 is also pivotally engaged with the neck of the hoe 17 and is provided at its free end with a handle or gripping member 24 arranged in position to be readily gripped by the driver for guiding the hoe. A seat 25 for the driver is preferably arranged at the rear of the machine and as shown is mounted on a U-shaped rod arranged between the ends of the thills with the ends thereof extending downwardly through said thills and bent laterally to form foot rests for the driver.

The hoe 17 may be made of any suitable or desired construction but is herein shown in the form of an ordinary weeding hoe and is arranged to operate transversely of the machine. A rotation of the fixed wheel 5 causes the large gear wheel 9 mounted on the axle 4 thereof to rotate the smaller gear wheel 11 which in turn rotates the pinion 12 and shaft 13 very rapidly and causes the crank member 14 of said shaft 13 to revolve and reciprocate the pitman or link 15, thereby imparting an oscillatory motion to the crank shaft 16 which reciprocates the hoe 17, both longitudinally and transversely. The hand lever is designed to be operated by the driver to cause the hoe to thin or cut out cotton or corn at a point desired and to leave the stand where it is wanted.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

What I claim as my invention is:—

1. In a weeding machine, a supporting structure comprising a pair of thills having their rear ends extended to form an axle support, pillows arranged on said thill extensions, an axle rotatably mounted in said pillows and projecting at opposite ends therebeyond, a ground wheel fixed to one end of said axle, another wheel loose on the other end of said axle, a gear wheel fixed on said axle, between said thill extensions, side members secured to said thills, gear wheels revolubly mounted between said side members and operable by the gear on said axle, a crank on the shaft of one of said wheels, a vertically disposed crank shaft extending through one of said thill extensions and having a crank arm at its upper end connected with the first mentioned crank, a crank arm at the lower end of said vertical shaft extending in a plane at right angles to the plane of the arm at the upper end thereof, and a hoe connected with said lower crank arm whereby a transversely and longitudinally reciprocating motion is simultaneously imparted thereto.

2. In a weeding machine, a supporting structure, an axle rotatably mounted therein and projecting at opposite ends therebeyond, a ground wheel fixed to one end of said axle, another wheel loose on the other end of said axle, a gear wheel fixed on said axle, upright members secured to said structure, gear wheels revolubly mounted between said upright members and operable by the gear on said axle, a crank on the shaft of one of said wheels, a vertically disposed crank shaft extending through said structure and having a crank arm at its upper end connected with the crank of the gear shaft, a crank arm at the lower end of said vertical shaft extending in a plane at right angles to the crank arm at the upper end thereof, a hoe connected with said lower crank arm whereby a reciprocating motion is imparted thereto, and adjustable means for varying the cutting depth of the hoe.

In testimony whereof I have hereunto set my hand in presence of two subscribing witnesses.

HALLS B. ETHERIDGE.

Witnesses:
   T. H. RUSSELL,
   M. H. BLOUNT.

---

Copies of this patent may be obtained for five cents each, by addressing the "Commissioner of Patents. Washington, D. C."